(12) United States Patent
Kalany et al.

(10) Patent No.: US 10,273,092 B2
(45) Date of Patent: Apr. 30, 2019

(54) APPARATUS AND METHODS FOR PRODUCT ORIENTATION AND HOLE HEALING APPLICATIONS

(71) Applicant: R.A Jones & Co., Covington, KY (US)

(72) Inventors: Robert M. Kalany, Florence, KY (US); Anthony B. Salvato, Cincinnati, OH (US); Mark Roland Godon, Midlothian, VA (US); Michael Andre Lemay, Midlothian, VA (US); Aleksandr Shneyder, Midlothian, VA (US)

(73) Assignee: R.A Jones & Co., Covington, KY (US)

( * ) Notice: Subject to any disclaimer, the term of this patent is extended or adjusted under 35 U.S.C. 154(b) by 0 days.

(21) Appl. No.: 15/805,841

(22) Filed: Nov. 7, 2017

(65) Prior Publication Data

US 2018/0127218 A1 May 10, 2018

Related U.S. Application Data

(60) Provisional application No. 62/418,381, filed on Nov. 7, 2016.

(51) Int. Cl.
*B65G 47/32* (2006.01)
*B65G 47/244* (2006.01)
(Continued)

(52) U.S. Cl.
CPC ......... *B65G 47/244* (2013.01); *B65G 47/252* (2013.01); *B65G 47/32* (2013.01);
(Continued)

(58) Field of Classification Search
CPC .............................. B65G 47/24; B65G 47/244
(Continued)

(56) References Cited

U.S. PATENT DOCUMENTS

| 2,643,778 | A | * | 6/1953 | Socke | ..................... B65G 47/24 |
| | | | | | 198/377.04 |
| 3,577,919 | A | * | 5/1971 | Usko | ..................... B65G 47/24 |
| | | | | | 101/35 |

(Continued)

FOREIGN PATENT DOCUMENTS

| EP | 0829435 A1 | 3/1998 |
| EP | 1486439 A2 | 12/2004 |

(Continued)

OTHER PUBLICATIONS

International Searching Authority, Partial Search Report Issued in Corresponding International Application No. PCT/US2017/060385 dated Feb. 7, 2018, 14 pages.

(Continued)

*Primary Examiner* — James R Bidwell
(74) *Attorney, Agent, or Firm* — Wood Herron & Evans LLP

(57) ABSTRACT

Articles are transferred from an article supply conveyor to an article receiving conveyor while the transferring articles are selectively reoriented. When the conveyors are in parallel, a travelling article reorienting turret seeks articles following an article absence or hole on the supply conveyor and transfers the following article to a next-in-line position on the receiving conveyor to cure or avoid holes of articles on the receiving conveyor.

11 Claims, 18 Drawing Sheets

(51) Int. Cl.
*B65G 47/84* (2006.01)
*B65G 47/52* (2006.01)
*B65G 47/91* (2006.01)
*B65G 47/252* (2006.01)

(52) U.S. Cl.
CPC ........... *B65G 47/52* (2013.01); *B65G 47/848* (2013.01); *B65G 47/914* (2013.01); *B65G 47/918* (2013.01); *B65G 2201/0235* (2013.01)

(58) Field of Classification Search
USPC ............ 198/398, 399, 400, 412, 441, 459.2
See application file for complete search history.

(56) References Cited

U.S. PATENT DOCUMENTS

| | | | | |
|---|---|---|---|---|
| 3,868,009 A | * | 2/1975 | Billi | B65G 47/847 198/377.05 |
| 3,961,698 A | * | 6/1976 | Ahlenius | B65G 47/24 198/377.03 |
| 4,192,415 A | * | 3/1980 | Krener | B65G 47/244 198/374 |
| 4,426,825 A | * | 1/1984 | Nordstrom | B65B 11/12 198/412 |
| 4,530,430 A | * | 7/1985 | Peterlini | B65G 47/244 198/395 |
| 5,113,996 A | * | 5/1992 | Francioni | B65G 47/846 198/441 |
| 5,310,041 A | * | 5/1994 | Draghetti | B65G 47/32 198/412 |
| 5,544,734 A | * | 8/1996 | Gebhardt | B65G 47/902 198/412 |
| 6,044,627 A | * | 4/2000 | de Guglielmo | B65B 11/105 198/377.03 |
| 6,845,861 B2 | * | 1/2005 | Spatafora | B65G 47/244 198/377.08 |
| 6,866,137 B2 | * | 3/2005 | Ohiro | A61F 13/15764 198/374 |

FOREIGN PATENT DOCUMENTS

WO 9950161 A1 10/1999
WO 2014064593 A1 5/2014

OTHER PUBLICATIONS

International Searching Authority, International Search Report and Written Opinion issue in related Application No. PCT/US2017/0160385 dated Apr. 30, 2018, 20 pages.

* cited by examiner

APPARATUS AND METHODS FOR PRODUCT ORIENTATION AND HOLE HEALING APPLICATIONS

PRIORITY CLAIM

Applicant claims the benefit of the filing date of Nov. 7, 2016 of U.S. Provisional Patent Application Ser. No. 62/418,381, which application is herewith incorporated herein in its entirety by reference.

FIELD OF THE INVENTION

This invention relates to apparatus and methods for selectively orienting articles transferring between conveyors and repairing holes or absences of missing articles in an incoming stream of articles.

BACKGROUND OF THE INVENTION

In packaging equipment, it is common and frequently necessary to reorient a product or article from an orientation in an incoming product or article stream to another orientation prior to loading it into a carton or bin. This need is most common when the incoming product is of odd shape and requires nesting in the packaging carton, or if the carton contains cut outs to showcase a feature of the product. In many cases, the product is roughly rectangular with sides longer than narrower ends, and is conveyed in a single stream with either narrow product end edge leading or broad side edge leading. The product can be, but is not limited to articles of various types such as pouches, bars, or trays.

The terms "article" and "product" are used herein interchangeably.

While several prior methods are known for product reorientation in packaging processes, known systems have inherent problems.

For example, in a packaging apparatus or process, one form of product packaging may require a specific product reorientation, while the next form of product packaging may require a different reorientation. Such requirements mandate expensive equipment change-out, or downtime for re-adjustment, equipment replacement or the like. It is difficult if not impossible to accommodate multiple product reorientation configurations in the same equipment.

Also, where product supply and product receiving conveyors are aligned in parallel directions, the problem of missing articles (or "holes") in an infeed or article supply line causes waste or downstream issues where an article is missing, or a formed article or product group is missing one or more of the articles or products. This is especially troublesome where product supply at a constant product pitch is anticipated but product is missing at a pitch position. Missing product or "holes" in the product supply line require filing or "healing", accomplished in the past only by processes such as incomplete product group rejection, product storage or product collection to fill out incomplete product supply or product groups, manual product insertions, etc. There typically is no apparatus or free excess product at the reorientation station for hole healing.

SUMMARY OF THE INVENTION

The invention contemplates, without limitation but in various preferred embodiments, apparatus and methods involving an article supply conveyor, an article receiving conveyor and a rotary article transfer turret for transferring articles from the article supply conveyor to the article receiving conveyor, while at the same time selectively reorienting the transferring articles, and the transfer turret in one embodiment being moveable along the article supply conveyor serving to heal or replace missing articles thereon.

In one embodiment according to the invention, article supply and article receiving conveyors are aligned in parallel, and a rotary article transfer turret is operably disposed between the parallel conveyors for transferring articles therebetween and selectively rotating transferring articles. The turret is also moveable along the conveyors to accomplish hole healing, i.e. fill absences on the supply conveyor so there are no article absences on the receiving conveyor.

In another embodiment the supply and receiving conveyors are perpendicularly oriented and a rotary article transfer turret is operably disposed therebetween for selectively orienting transferring articles, but without hole healing functions.

As used herein, the terms "selective" and "selectively" refer to either changing or not changing the orientation of an article between its respective orientation on an article supply conveyor and its orientation on an article receiving conveyor, the apparatus and methods capable of doing either.

DETAILED DESCRIPTION OF THE INVENTION

Various functional and exemplary applications of the invention are depicted in FIGS. 1-10. Details of the respective transfer turrets are described in the following two embodiments, and in the following description of Hole Healing.

FIGS. 1-4 illustrate one embodiment of the invention where an article or product supply conveyor is oriented in a direction parallel to an article or product receiving conveyor.

FIGS. 5-8 illustrate an alternate embodiment of the invention where an article or product supply conveyor is oriented in a direction perpendicularly to an article or product receiving conveyor.

Figure 9:
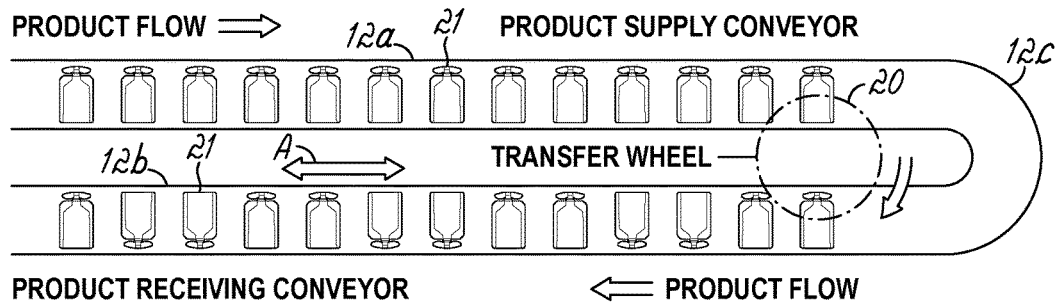
FIG. 9 is an illustrative diagrammatic plan view of a U-shaped conveyor, selectively rotating a product, that is initially traveling broad edge leading, 180 degrees while moving product from one leg of the U-shaped conveyor to the other parallel leg.
Figure 10:
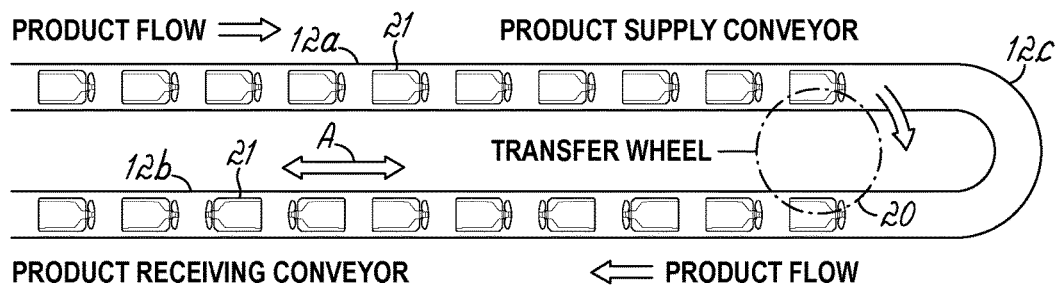
FIG. 10 is an illustrative diagrammatic plan view of a U-shaped conveyor, selectively rotating a product, that is initially traveling narrow edge leading, 180 degrees while moving product from one leg of the U-shaped conveyor to the other parallel leg.
Figure 11:
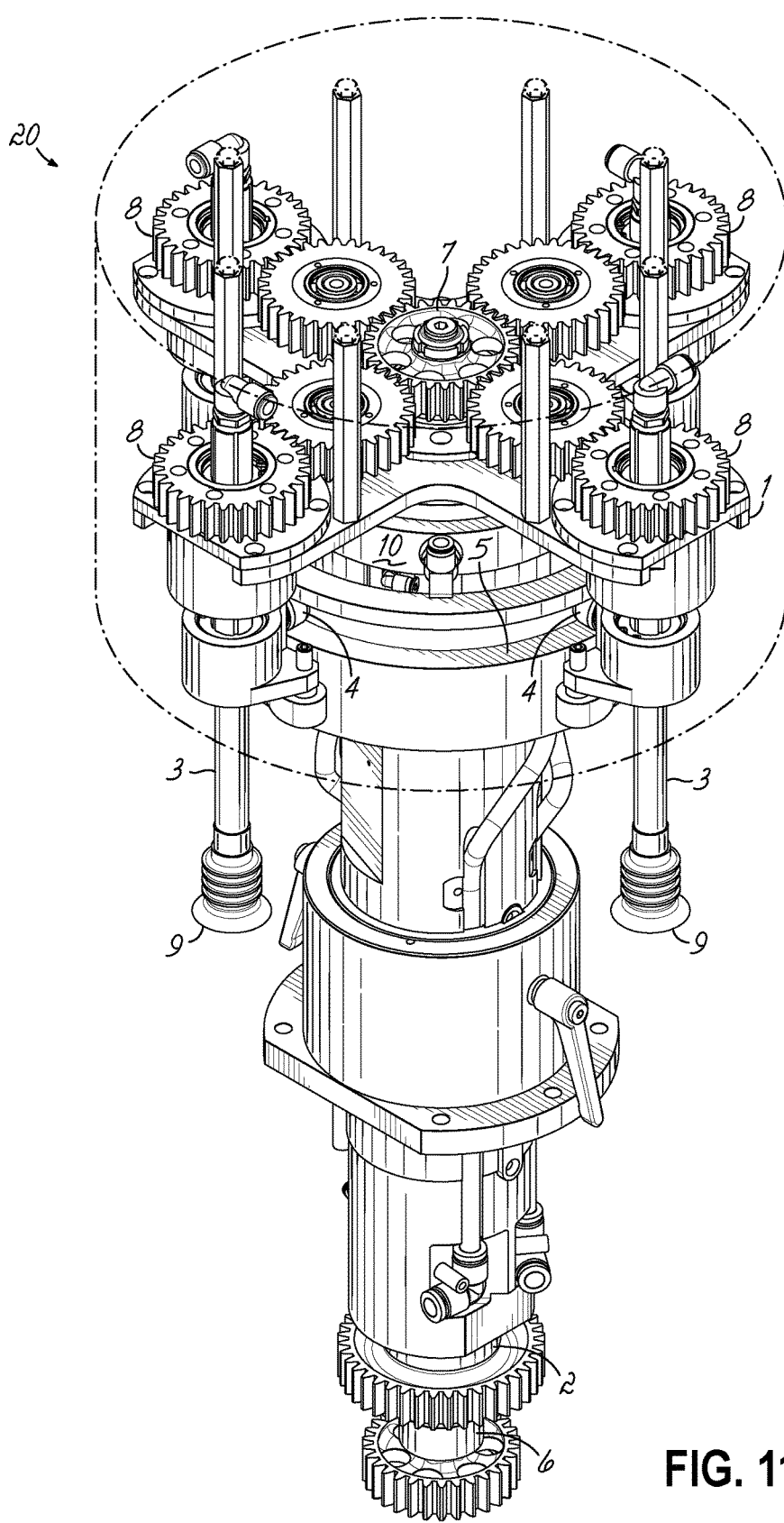
FIG. 11 is an isometric view of one form of a transfer turret.
Figure 12:
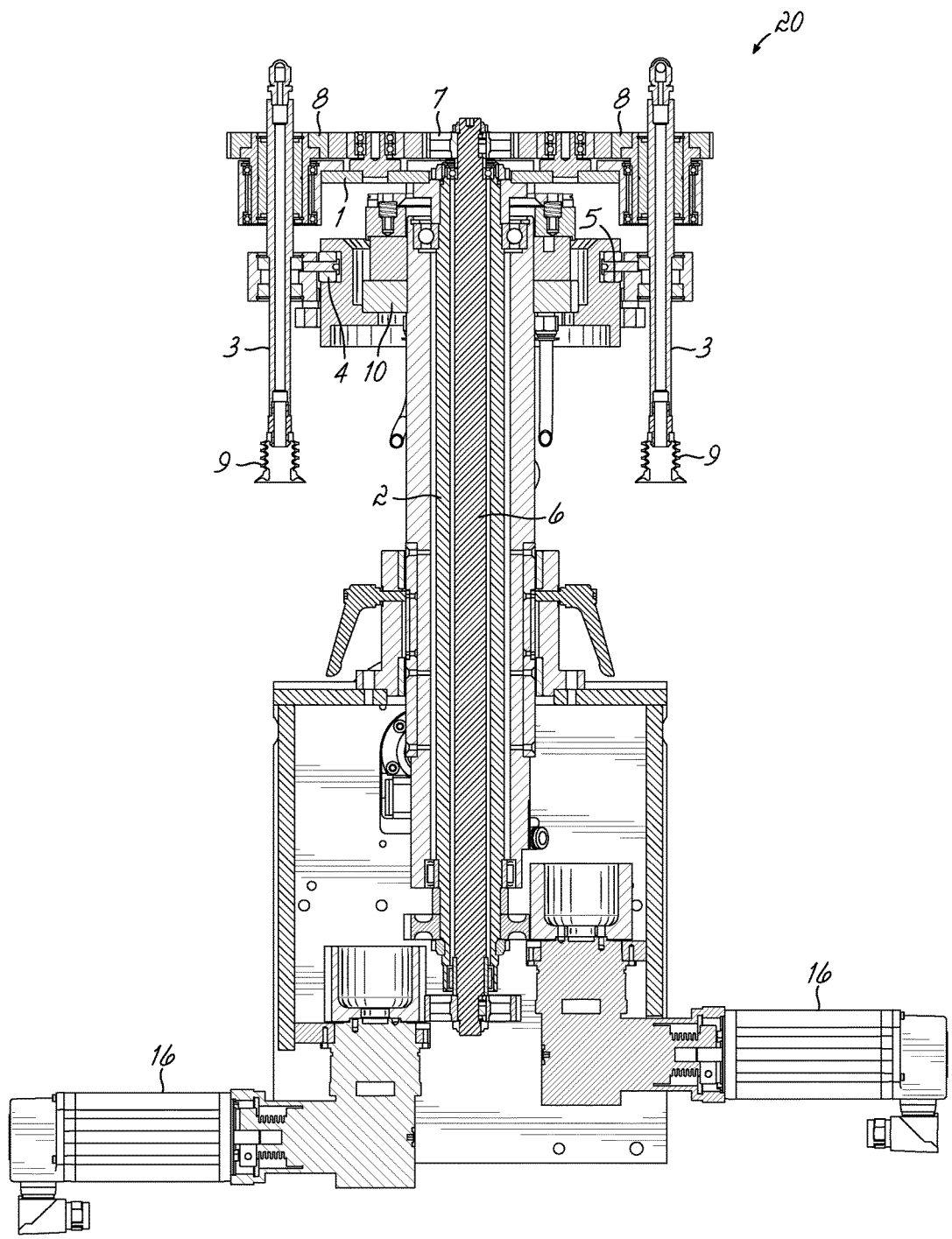
FIG. 12 is a section view of the transfer turret of FIG. 11.
Figure 13:
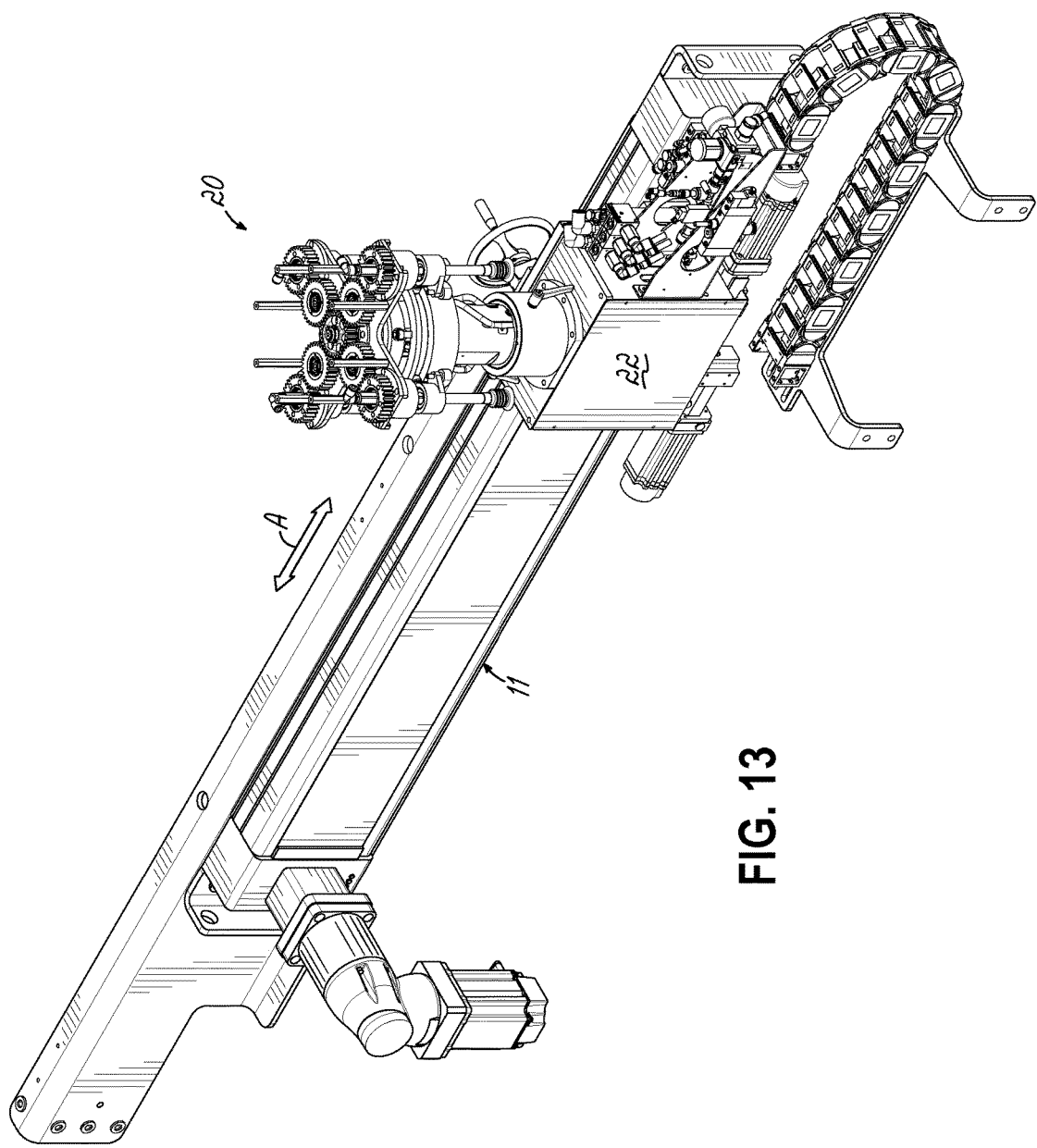
FIG. 13 is an isometric view of the turret of FIGS. 11, 12 with linear actuator or carriage and cable tray for moving the turret up and down stream to manage hole healing.
Figure 14:
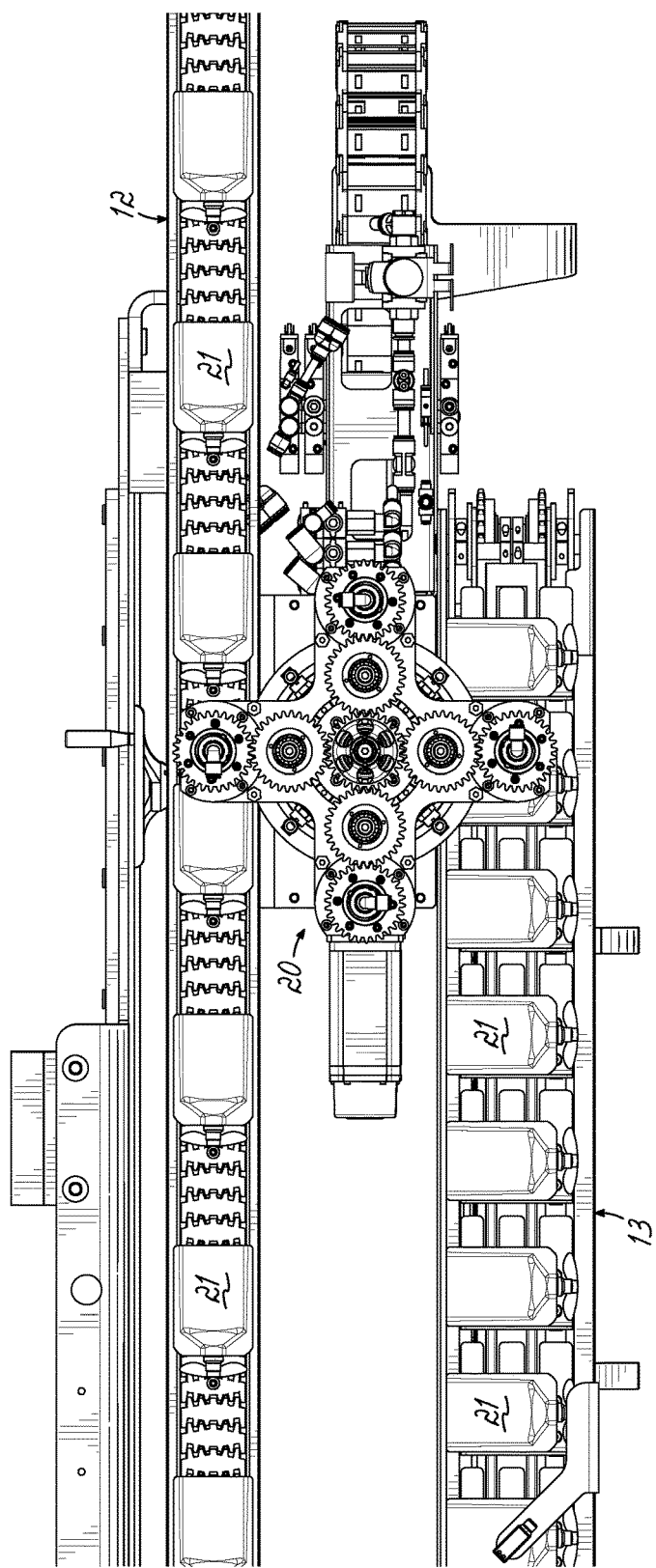
FIG. 14 is a top view of a product infeed conveyor, a turret with linear actuator and a downstream article receiving conveyor.
Figure 15:
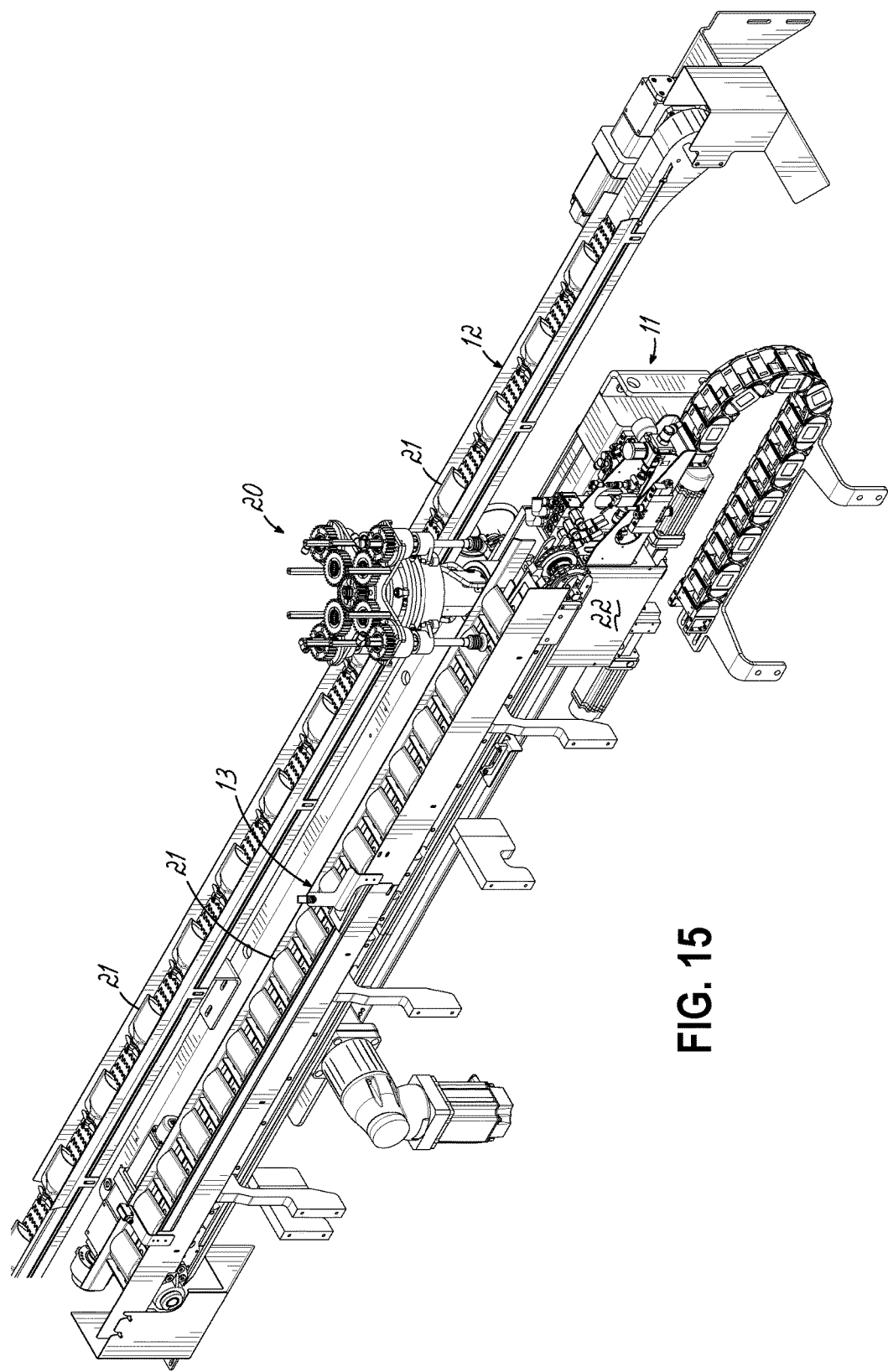
FIG. 15 is an isometric view of FIG. 14.
Figure 16:
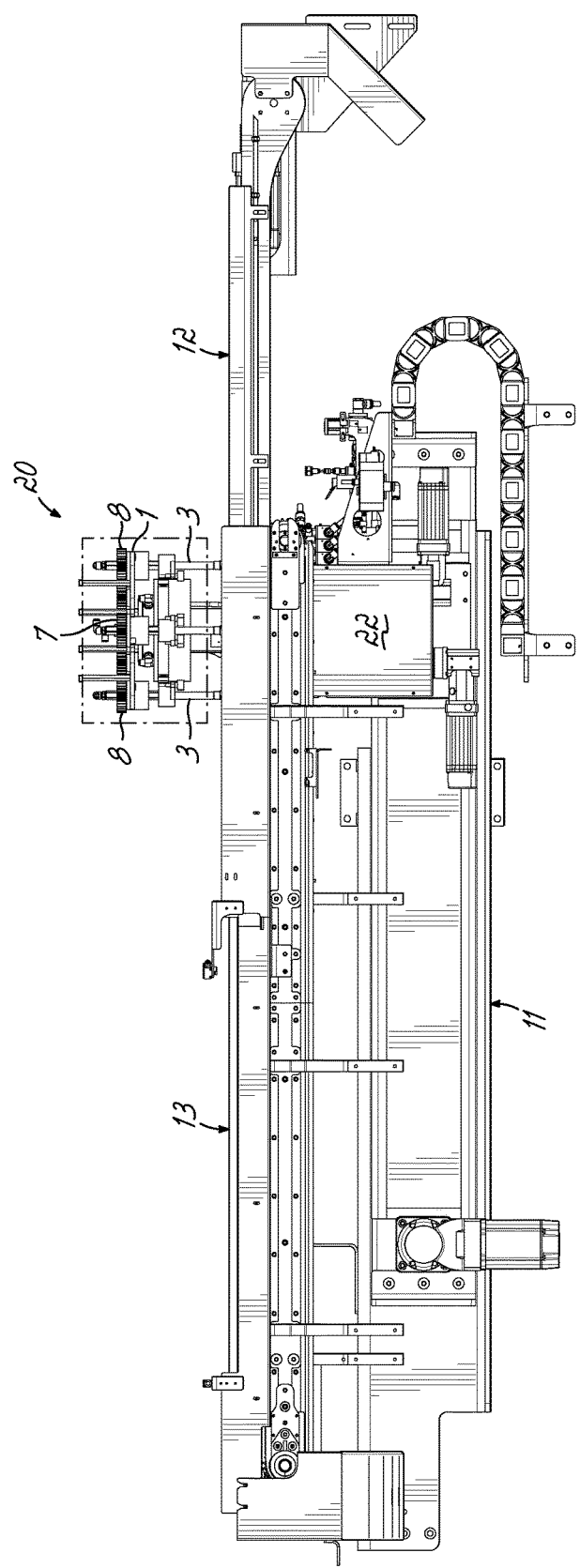
FIG. 16 is an elevation view of FIG. 14.
Figure 17:
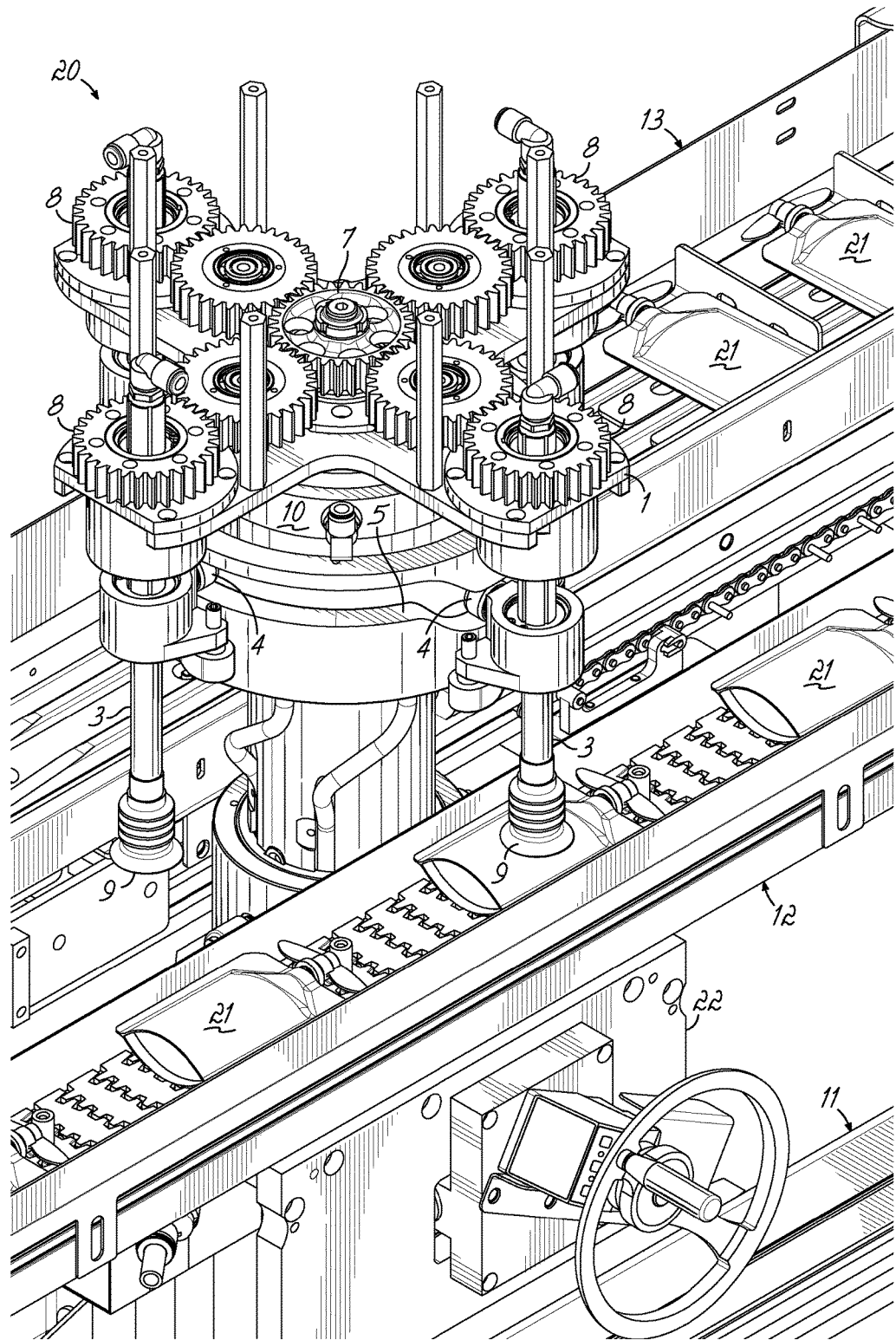
FIG. 17 is a close-up isometric view of the turret and infeed conveyor.
Figure 18:
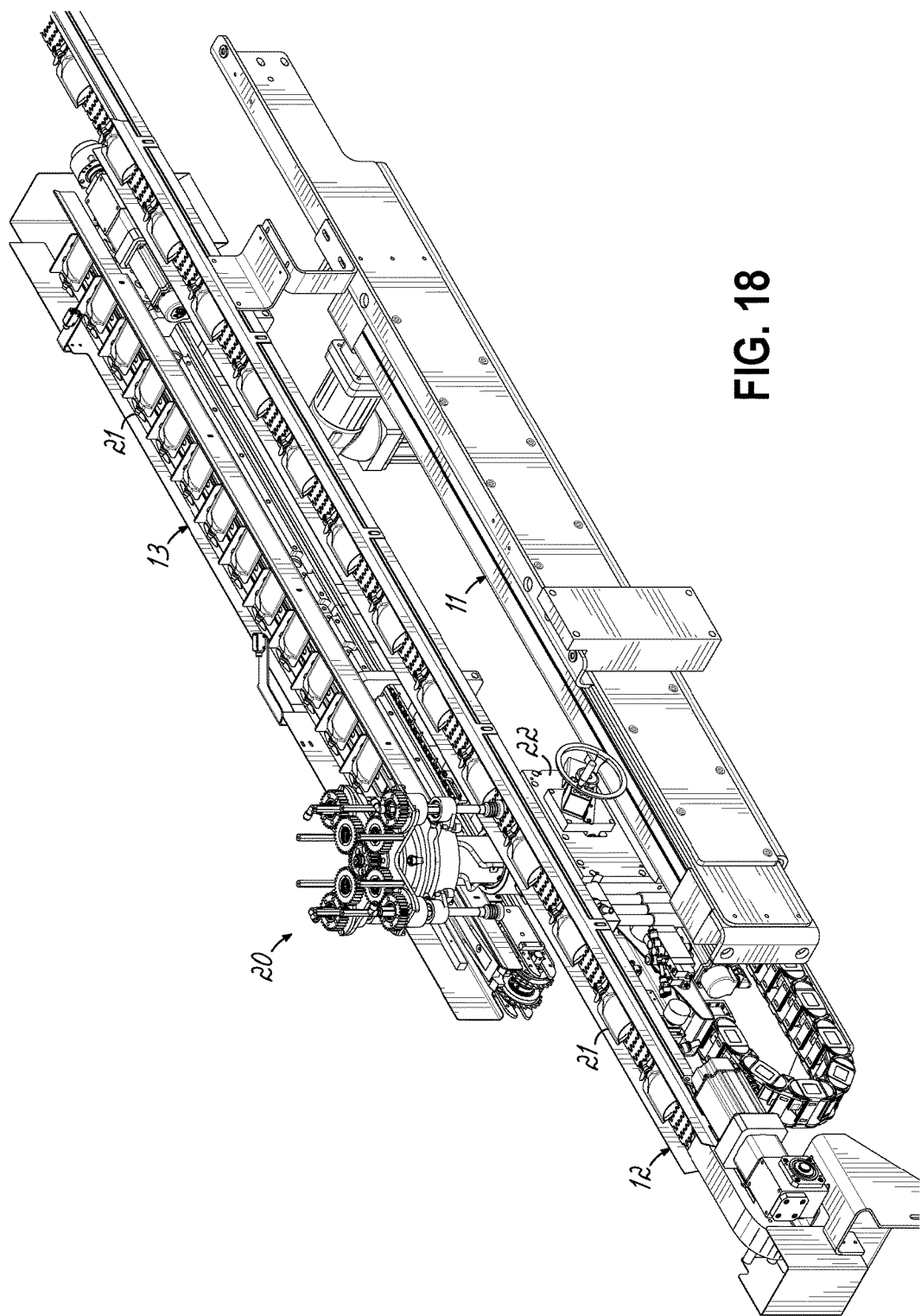
FIG. 18 is an isometric view, reverse projection of FIG. 15.
Figure 19:
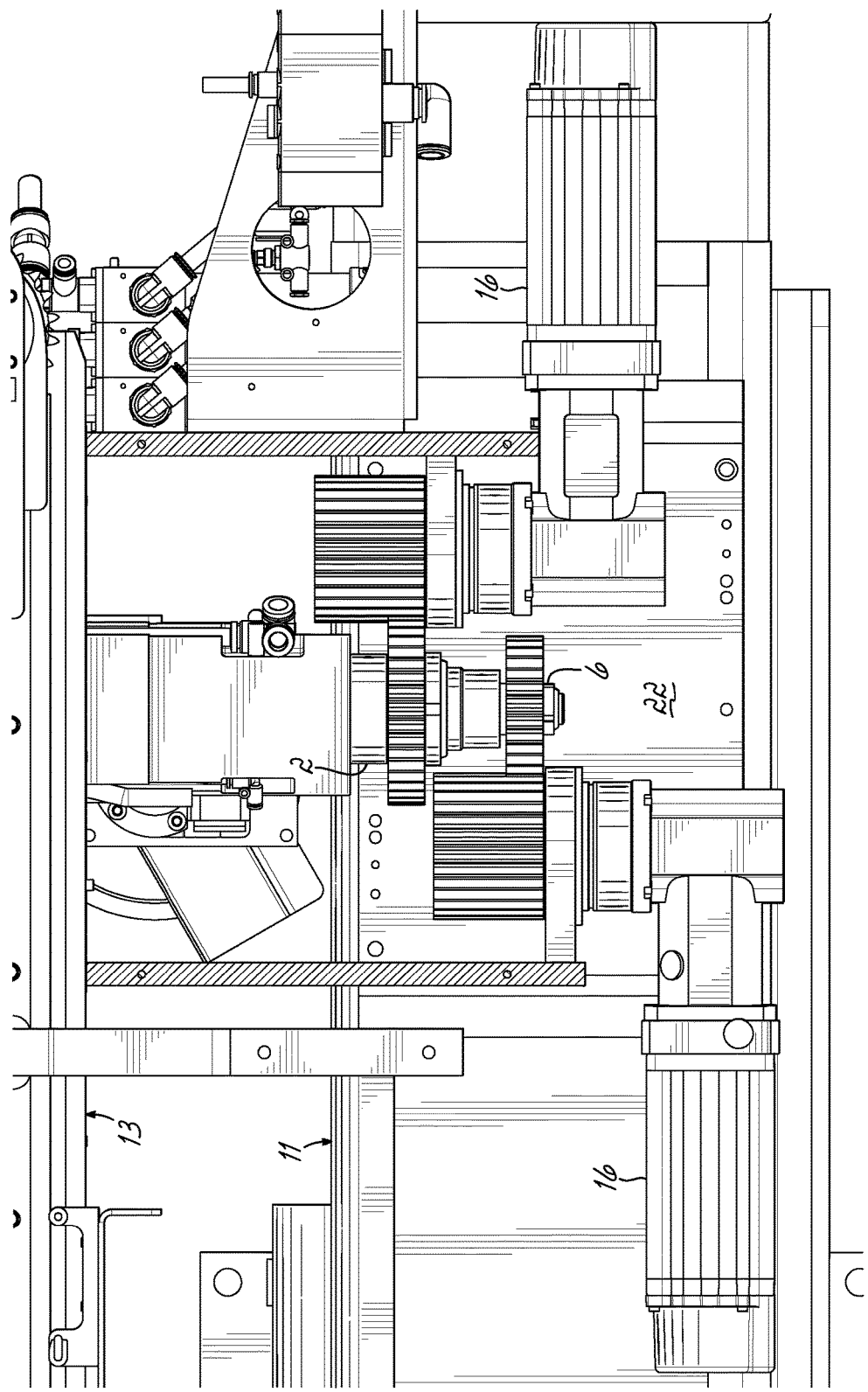
FIG. 19 is an elevation view of the turret drive.
Figure 20:
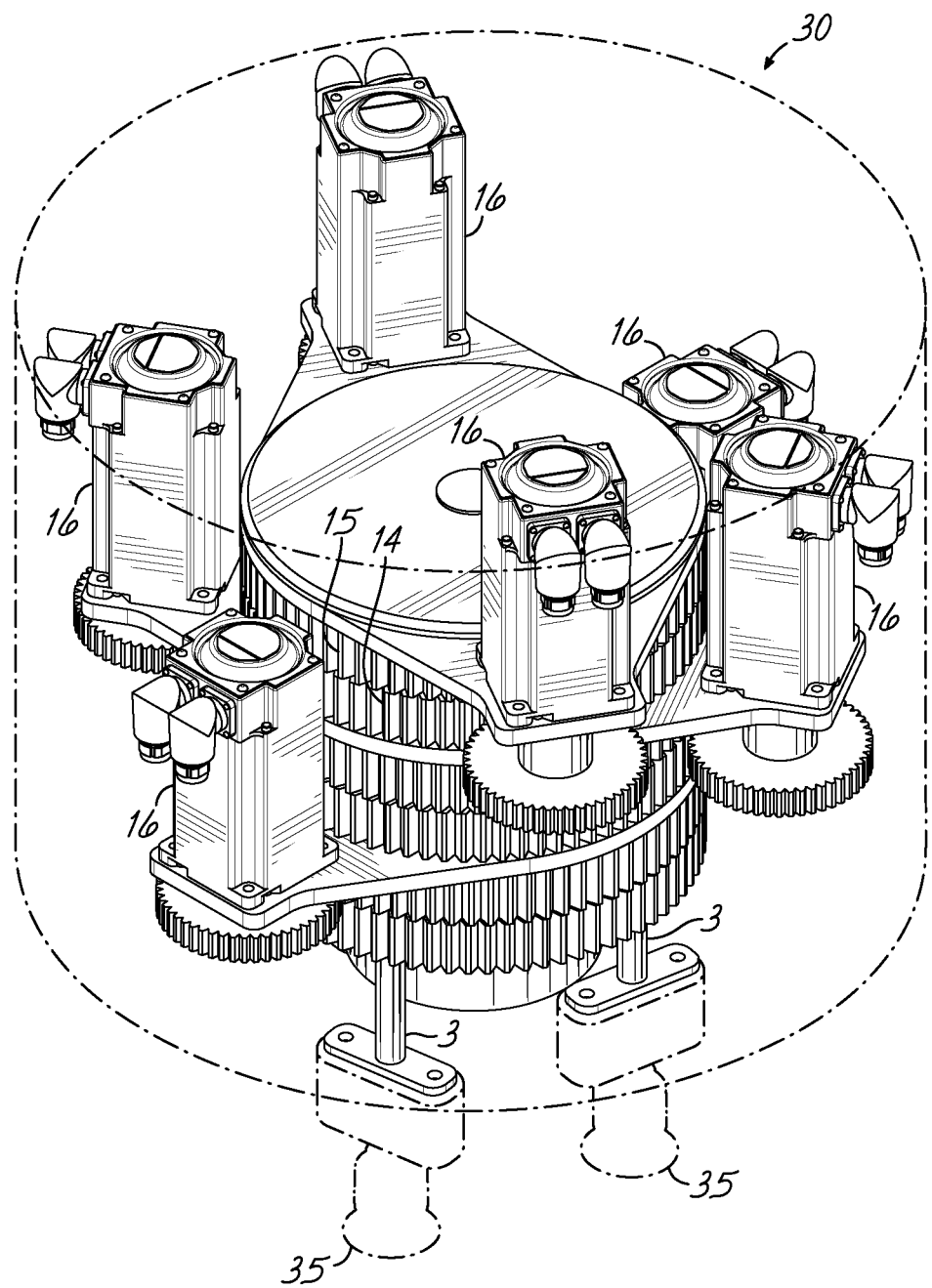
FIG. 20 is an isometric view of another form of transfer turret including a planetary drive system providing independent control for each of the re-orienting spindles.
Figure 21:
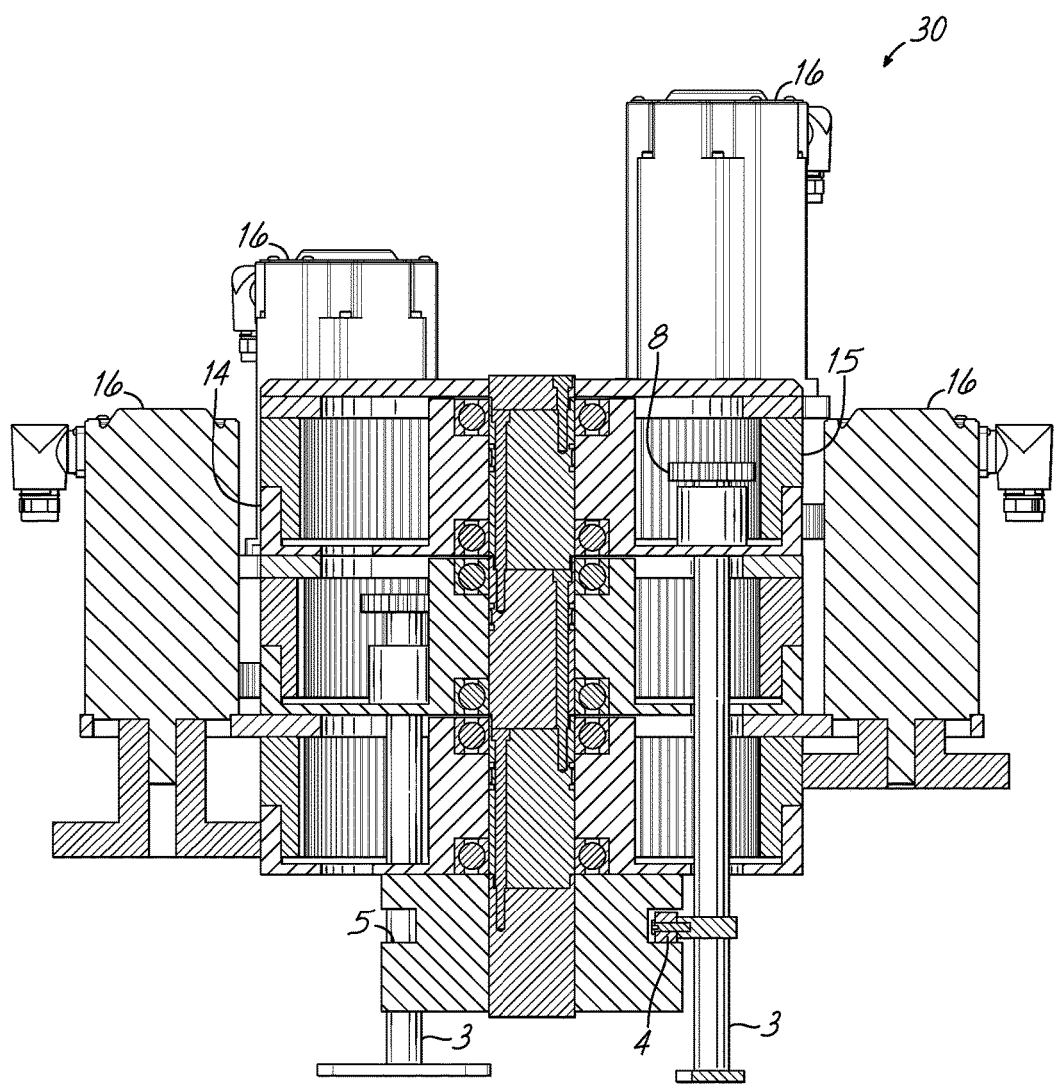
FIG. 21 is a section view of FIG. 20.
Figure 22:
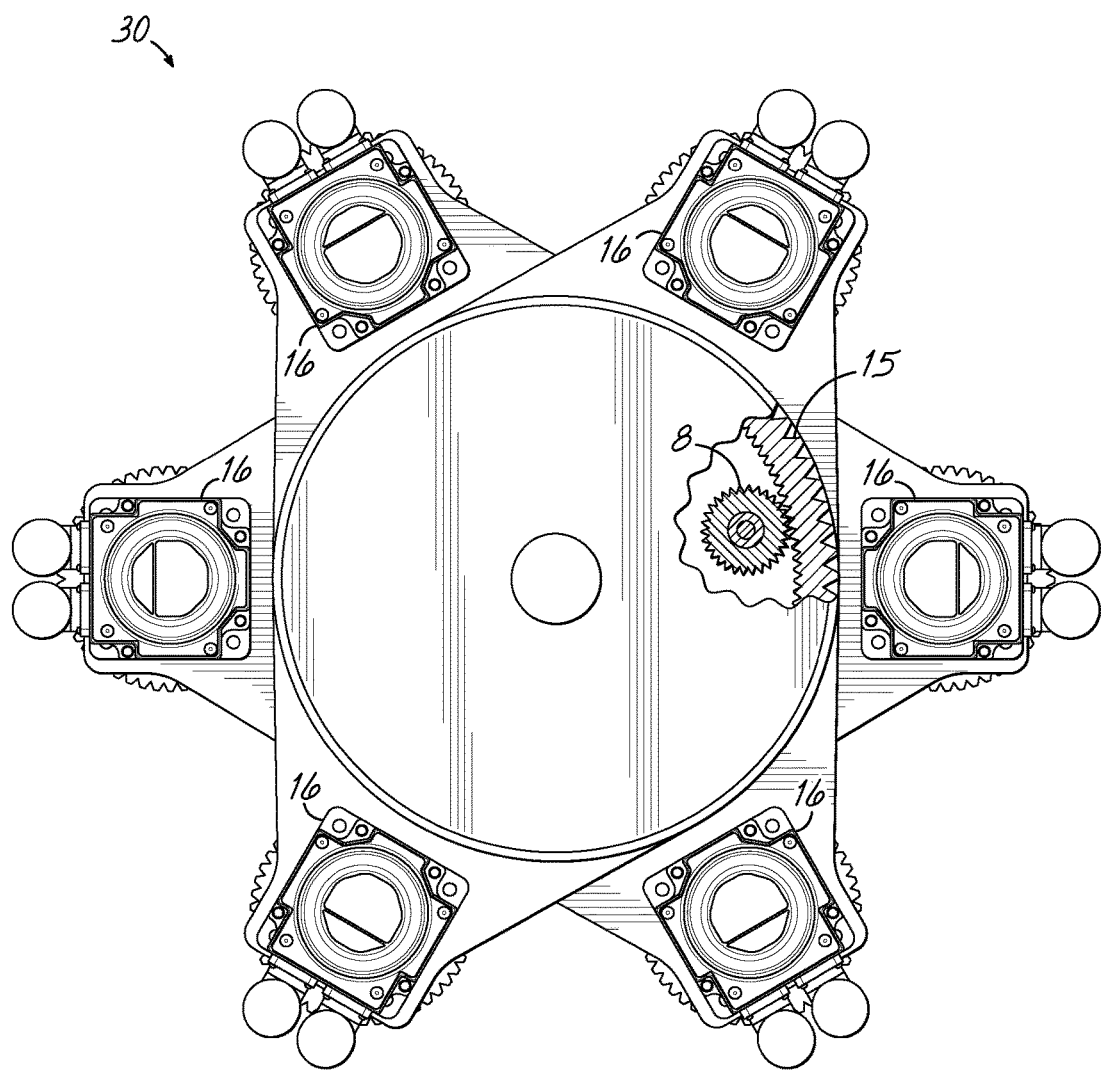
FIG. 22 is a plan view of FIG. 20.
Figure 23:
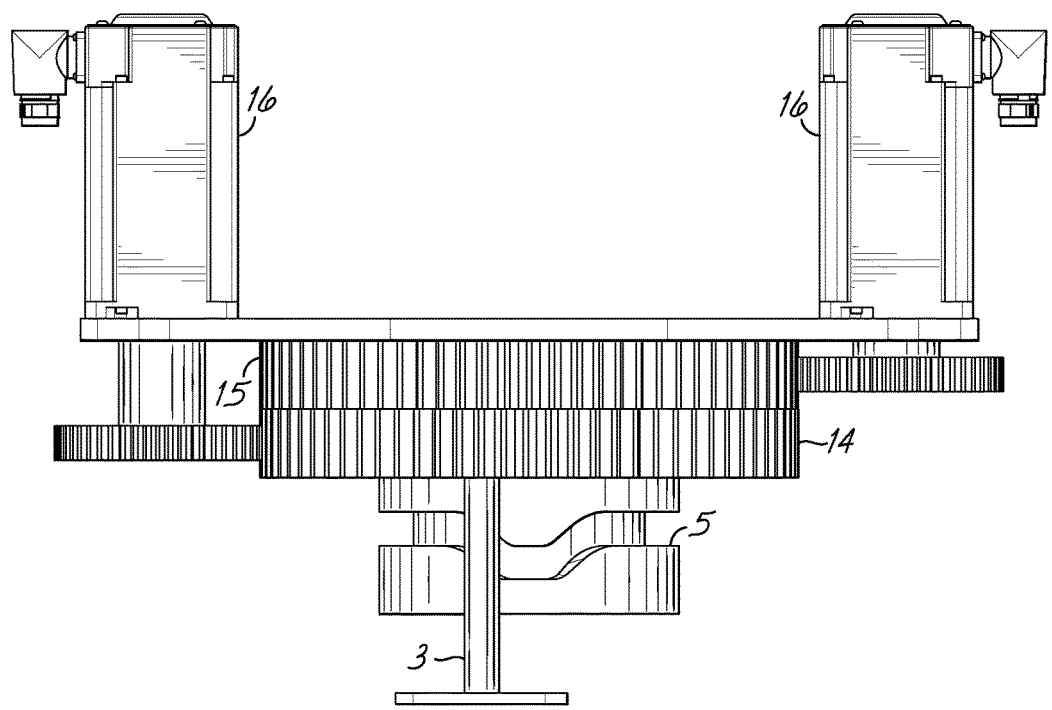
FIG. 23 is an elevation view of one spindle of the embodiment in FIG. 20.
Figure 24:
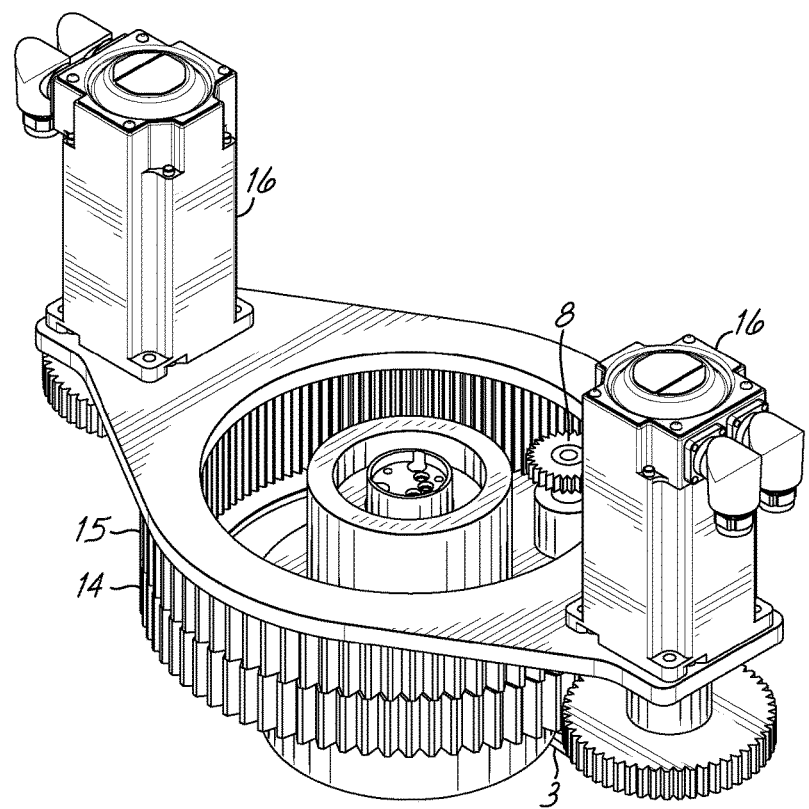
FIG. 24 is a reverse isometric view of FIG. 23.

FIGS. 9-10 illustrate a variation of FIGS. 1-4 wherein articles or products are transferred between parallel runs of the same conveyor, the runs joined in "U"-shaped configuration.

FIGS. 11-24 illustrate features of alternate rotary turrets used in either alternate embodiment.

Embodiment 1

FIGS. 1-4 illustrate one embodiment of the invention in connection with parallel product supply conveyors 12, 13. A rotating transfer apparatus or turret such as a rotary turret 20 or 30 is operably disposed between conveyors 12, 13.

The control of turret 20, 30 being varied to accomplish the transfer and selective orientation of articles on conveyor 12 to another orientation on conveyor 13. Details of the transfer turret 20 or 30 of this embodiment are described below.

For clarity in describing the embodiments herein, the respective products or articles have caps or fitments on one narrower end, as shown, and two broader side edges extending between the narrow ends. Other product configurations can be handled as described herein.

Figure 1:
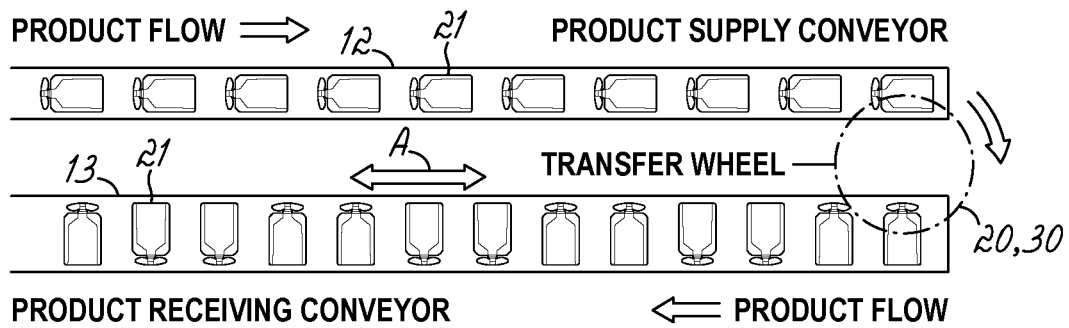
FIG. 1 is an illustrative diagrammatic plan view of two parallel counter flow conveyors, with selectively rotating a product, that is initially traveling narrow edge leading, 90 degrees while moving the product to a parallel conveyor.

FIG. 1 illustrates selectively rotating an article traveling narrow end edge leading 90 degrees while transferring the article to a parallel counter flowing conveyor 13. Here articles on receiving conveyor 13 are in groups of two, each group having the same article ends oriented to the same direction and 180 degrees opposite to those articles in adjacent groups of two, for example.

Figure 2:
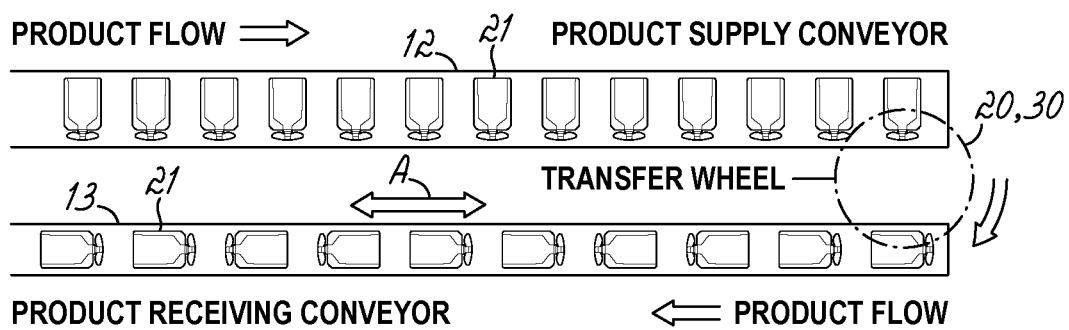
FIG. 2 is an illustrative diagrammatic plan view of two parallel counter flow conveyors, with selectively rotating a product, that is initially traveling broad edge leading, 90 degrees while moving the product to a parallel conveyor.

FIG. 2 illustrates selectively rotating an article that is traveling broad side edge leading 90 degrees while transferring the article to a parallel counter-flowing receiving conveyor 13.

Here, articles 21 are reoriented into groups of two articles with each article in the same group having narrow ends oriented in the same direction but 180 degrees opposite to those articles in adjacent groups of two, for example.

Figure 3:
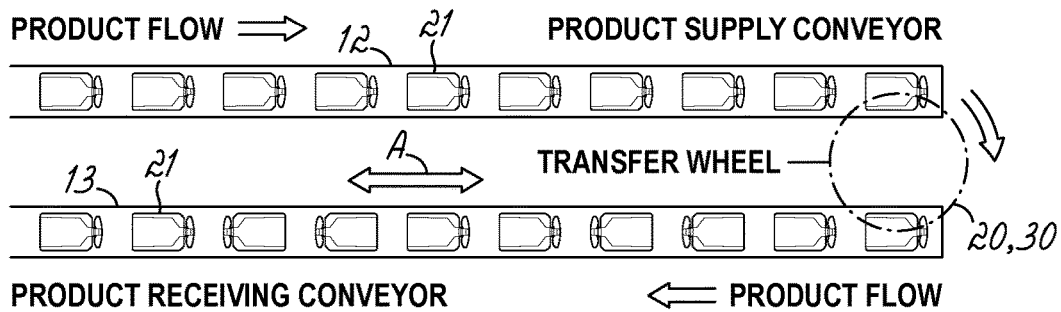
FIG. 3 is an illustrative diagrammatic plan view of two parallel counter flow conveyors, with selectively rotating a product, that is initially traveling narrow edge leading, 180 degrees while moving product to a parallel conveyor.

FIG. 3 illustrates selectively rotating articles 21 incoming on conveyor 12 traveling narrow end leading 180 degrees while transferring articles to parallel counter-flowing product receiving conveyor 13. Here articles on receiving conveyor 13 are in groups of two, like those in FIG. 2, for example.

Figure 4:
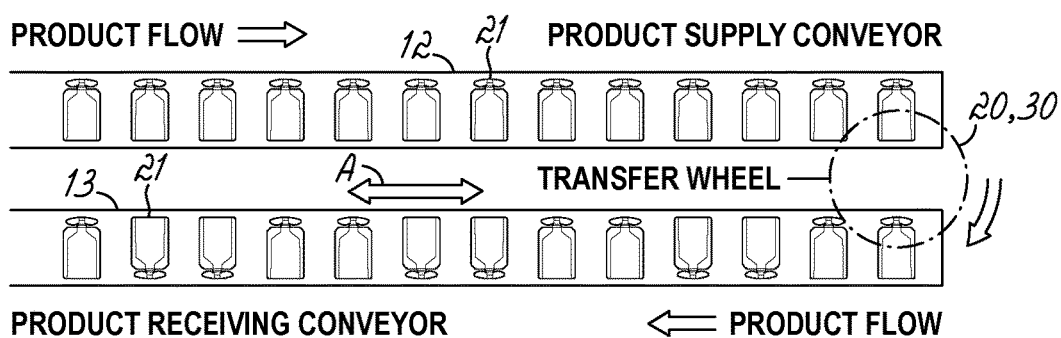
FIG. 4 is an illustrative diagrammatic plan view of two parallel counter flow conveyors, with selectively rotating a product, that is initially traveling broad edge leading, 180 degrees while moving product to a parallel conveyor.

FIG. 4 illustrates selectively rotating articles 21 incoming on conveyor 12, traveling broad side edge leading 180 degrees while transferring articles to parallel, counter flowing receiving conveyor 13.

Articles 21 on conveyor 13 are disposed in groups of two, each oriented in the same direction and 180 degrees opposite to those articles in adjacent groups, for example.

FIGS. 1-4 are illustrative only of the article or product orientation on conveyor 13, and that orientation, or the number of products in a group may be easily changed by controlling the selective rotation of the vacuum cups 9 noted above via control of respective servo motors 16.

Turning briefly to FIGS. 9 and 10, these Figs, respectively illustrate a single U-shaped conveyor 12 having an article supply infeed run 12a and a parallel article receiving run 12b. Articles 21 are conveyed toward transfer turret 20 in one direction and are selectively rotated and transferred to parallel, counter-flowing receiving run 12b by transfer turret 20.

FIG. 9 is illustrated with respective product orientations as in FIG. 4, while FIG. 10 is illustrated with respective product orientations as in FIG. 3.

Conveyor runs 12a and 12b are operatively joined at conveyor section 12c as illustrated.

Otherwise, selectively transferring articles in the apparatus of FIGS. 9 and 10 is similar to that of FIGS. 4 and 3, respectively.

Embodiment 2

In a second embodiment of the invention, either a rotary transfer turret 20 or a varied rotary transfer turret 30 is useful in transferring products 21 from a product or article infeed or supply conveyor 32 to a product or article receiving conveyor 33 oriented and extending perpendicularly to infeed conveyor 32. The turret 20 or 30 is operably located at a position to convey product suction cups 35 in a circular path over conveyor 32 and conveyor 33 to engage, lift and selectively rotate articles 21 from conveyor 32 and to then place articles on conveyor 33 in a desired pattern or grouping or into a selected orientation different from that on conveyor 32.

In the embodiment of FIGS. 5-8 incoming products 21 are selectively reoriented to a desired orientation different from that in which they reach the transfer 20, 30.

Figure 5:
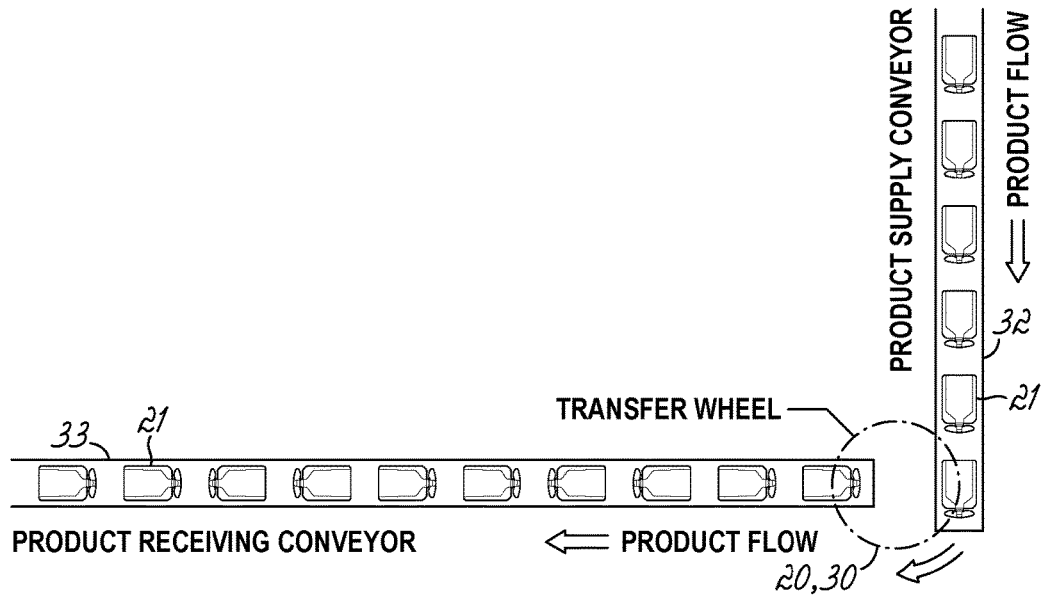
FIG. 5 is an illustrative diagrammatic plan view of perpendicular conveyors with selectively rotating a product, that is initially traveling narrow edge leading, 90 degrees while moving the product to a perpendicular conveyor.

In operation, FIG. 5 illustrates selectively rotating a product travelling narrow end leading on conveyor 32 through 90 degrees to perpendicular receiving conveyor 33.

Figure 6:
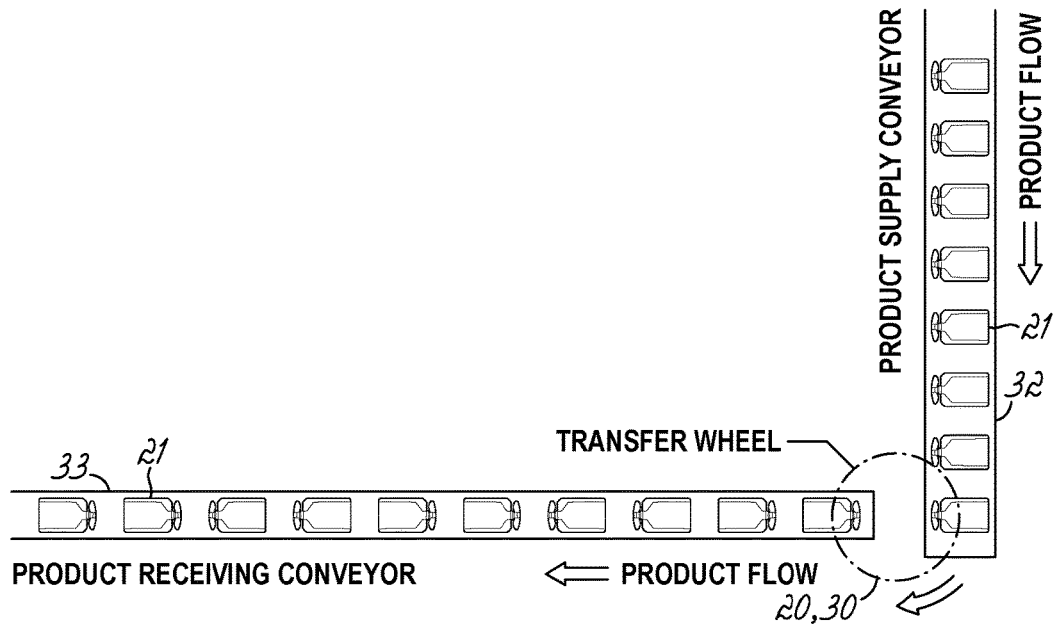
FIG. 6 is an illustrative diagrammatic plan view of perpendicular conveyors, with selectively rotating a product, that is initially traveling broad edge leading, 180 degrees while moving the product to a perpendicular conveyor.

For example, as in FIG. 6, products on conveyor 33 are selectively disposed in groups of two, with each product in a group oriented in the same direction but at 180 degrees opposite to the products in adjacent groups.

FIG. 6 illustrates selectively rotating a product 21 traveling broad edge leading 180 degrees while transferring the product to perpendicular conveyor 33. In this regard, and for example, product orientation conveyor 33, is like that of FIG. 5, however incoming product orientation on conveyor 32 of FIG. 6 is 90 degrees different than on conveyor 32 of FIG. 5.

Figure 7:
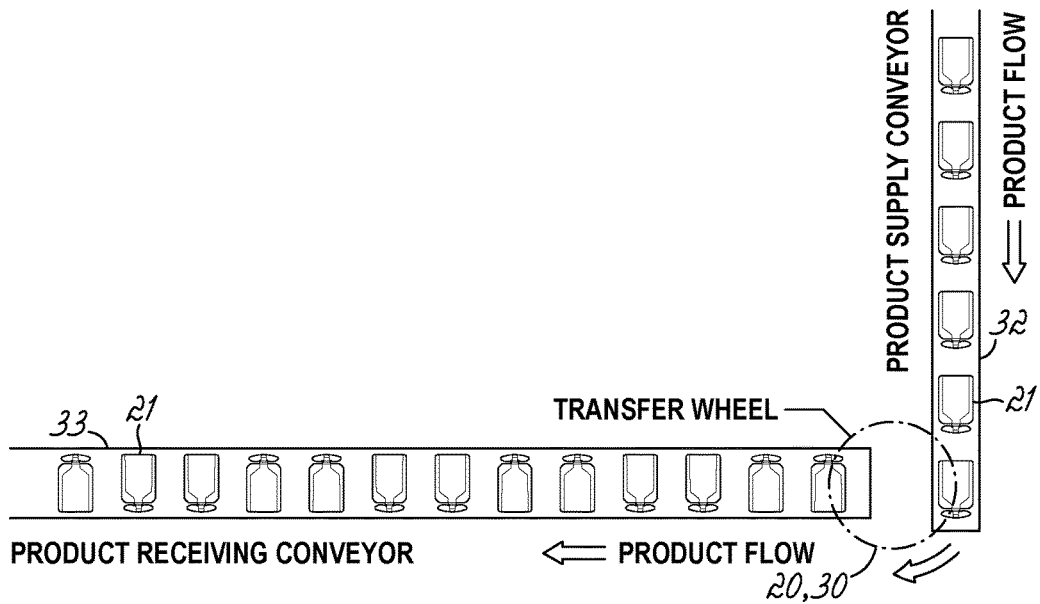
FIG. 7 is an illustrative diagrammatic plan view of perpendicular conveyors, with selectively rotating a product, that is initially traveling narrow edge leading, 180 degrees while moving product to a perpendicular conveyor.

FIG. 7 illustrates selectively rotating a product traveling narrow edge leading on supply conveyor 32 to perpendicular conveyor 33 and at 180 degrees from product orientation on conveyor 32. Thus final product orientation on conveyor 33 is like that of products 21 on conveyor 33 of FIG. 8, for example, although the incoming product orientation is different.

Figure 8:
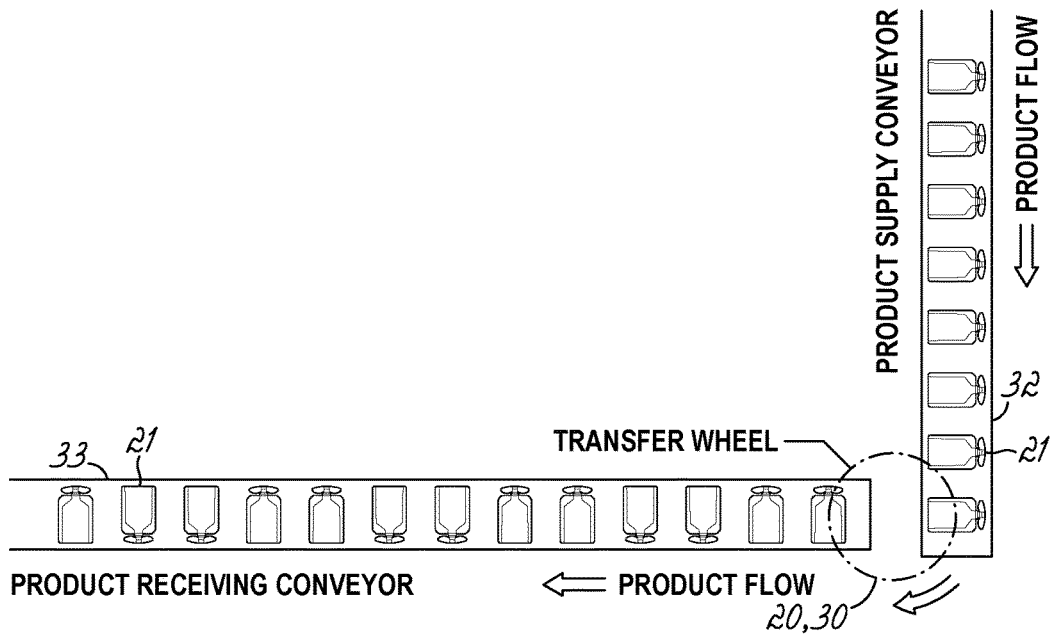
FIG. 8 is an illustrative diagrammatic plan view of perpendicular conveyors, with selectively rotating a product, that is initially traveling broad edge leading 90 degrees while moving product to a perpendicular conveyor.

FIG. 8 illustrates selectively rotating a product traveling broad edge leading on supply conveyor 32 to perpendicular 33 and at 90 degrees from product orientation on conveyor 32.

It will be appreciated that the orientation of products on conveyor 32 of the FIGS. 5-8 and the reorientation, product groups, and number of products in the groups on receiving conveyor 33 can be selectively varied.

Rotary Turret 20

One rotary transfer turret 20 for use in the embodiments of FIGS. 1-10 is shown in FIGS. 11-19. It will be appreciated in FIGS. 13-16 that the rotary transfer turret 20 is mounted on a carriage 22 carried on linear slide 11 for selective reciprocal motion between and in the same direction as the parallel extensions of conveyors 12 and 13, and 12a, 12b.

The rotary transfer turret 20 is provided with a plurality of rotatable product or article suction cups 9, each individually rotatable and each carried in a circular path extending over the conveyors 12, 13. The vacuum cups 9 are controllable to pick up articles 21 on conveyor 12, selectively rotate or reorient them as the transfer turret 20 turns, and deposit them on conveyor 13, in selectively reoriented status.

To this end, cups 9 are mounted on turret apparatus 20 so as to be extensible to engage articles 21, retractable to lift them and then deposit them on conveyor 13.

Referring to FIGS. 11-19, rotary transfer turret 20 may be of any suitable construction consistent with the foregoing function. FIGS. 11-19 illustrate but one form of suitable transfer turret 20, operably oriented over the various product article supply and article receiving conveyors. Turret 20 includes a rotating disc or arm 1 on the end of a central main shaft 2 and contains two or more spindle assemblies 3 that are able to independently move vertically by a cam follower 4 in a cam track 5. Central main shaft 2 is driven by a servo motor 16. A second shaft, the orientation shaft 6, is driven by a second servo motor 16 and goes through the main shaft 2. At the end of the orientation shaft 6 is a sun gear 7. The sun gear 7 is connected via a gear train to a planet gear 8 at the end of each spindle assembly. By changing the relative speed between the main shaft 2 and the orientation shaft 6, the spindles 3 rotate a programmable number of degrees, from 0 to 360.

At the bottom of each spindle 3 is the vacuum cup 9 that holds the product while it is being lifted and selectively rotated. Vacuum to each spindle 3 is controlled through a vacuum shoe 10 which allows each spindle to have an independent vacuum source through its travel around the main shaft 2.

The respective spindles, gears and shafts are driven by any suitable means such as the servo motors 16 as illustrated.

The article supply conveyor 12 contains a moving supply of product. At a product pick point, the cam track 5 will cause the cam follower 4 of the spindle assembly 3 to lower until the vacuum cup 9 operably engages the product. The cam track 5 will then raise the spindle assembly 3 lifting the product off of the article supply conveyor 12. A motor driving the orientation shaft 6 will speed up or slow down, changing the speed of the sun gear 7 which in turn selectively changes the orientation of the product carried by the spindle assembly 3. At a product place point over the outgoing article receiving conveyor 13, the vacuum supply to the spindle assembly 3 will be replaced by pressure through the vacuum shoe 10 and cause the product to drop onto the outgoing conveyor 13 in a proper orientation and serially for downstream processes, such as cartoning or packaging.

Rotary Turret 30

Reference is made to FIGS. 20-24 respecting rotary transfer turret 30. Similarly functioning parts therein bear the same number as those elements of FIGS. 11-19. A spindle assembly 3 is attached to a spindle holding gear 14 which is driven by an externally mounted motor as shown. A suitable servo motor drives the spindle assembly 3 around a center post. As the spindle assembly travels over an infeed conveyor 32 in a circular path, the entire spindle assembly 3 can translate vertically, driven by a cam follower in a cam track 5 (as in turret 20), picking up a product using a vacuum or other gripping device. A second externally mounted servo motor controls the spindle orientation gear 15 (FIG. 21) which in turns rotates a planet gear 8 on the end of the spindle assembly 3 to rotate the product a programmable amount orienting the product properly for release onto the outgoing conveyor 33. The spindle holding gear 14, the spindle assembly 3, the spindle orientation gear 15, and their respective servo motors make up a single spindle unit moving and selectively orientating product from the infeed to the outgoing conveyor 33. Multiples of these units may be stacked to have two, three, or four independently controlled spindles rotating around a center shaft. The advantage of this turret 30 over the turret 20 described above is that the rotational speed of the spindle around the center post and the orientation of the product can be controlled independently of each other. This allows the spindle assembly to match the speed of the infeed 32 and outgoing 33 conveyor regardless of what the other spindles are doing. It also allows more time for the product orientation.

Any suitable turret construction can be used, and it will be appreciated either turret 20, 30 can be used in each of the embodiments disclosed.

Hole Healing

When the article supply conveyor 12 (or portion 12a) is oriented or disposed in parallel to article receiving conveyer 13, (or portion 12b), article holes or spaces on the supply conveyors 12, 12a (portion 12a) can be healed such that there are no such holes or missing articles on the article receiving conveyors 13, 12b.

With a constant article stream with no article holes, the turret 20, 30 will remain at the same position relative to article pick and place points. However, if there is a whole or missing article on the supply conveyor, this anomaly can be cured.

Thus in this application of article transfer between parallel conveyors 12, 13 (FIGS. 1-4) or conveyor portions 12a, 12b, (FIGS. 9, 10) the rotary turret 20 or 30 used is mounted on a carriage 22 sliding along slide 11 in parallel to both conveyors or conveyor portions.

In the event that an article 21 is missing on conveyor 12 (or portion 12a) in a position where it is expected to be (i.e. a "hole") the transfer 20 or 30 is moveable in an upstream direction of arrow "A" along conveyor 12 (12*a*) to the next position where an article 21 is located. Thus transfer 20 (or 30) is moveable to the left as illustrated in FIGS. 1-4 and 13-16, for example, (Arrow "A") to pick an article 21 from conveyor 12 (12*a*). Transfer 20, 30 is then operated to deposit the just picked article 21 on conveyor 13 (12*b*) with no hole or absence of an article in the articles on conveyor 13 (12*b*). The article 21 is selectively reoriented prior to deposit to fill the next serial position on conveyor 13. Hole healing as well as article reorientation is accomplished. Said in another way, the turret (20 or 30) "jumps" the missing article space to pick the next available article on the supply conveyor.

The rate of the conveyors such as conveyor 13 may be adjusted, such as retarded, to accommodate this hole healing operation, and return of the transfer 20, 30 to its original position.

In addition to the hole healing functions described herein for the first embodiment, it will be appreciated that the invention in the applications of both embodiments is capable of varying the pitch of articles on the receiving conveyors from that of the incoming articles on the supply conveyors by varying the speeds of the respective conveyors.

These and other advantages and modifications can be readily appreciated by those of ordinary skill in the art without departing from the scope of the invention and applicant intends to be bound only by the claims appended hereto.

What is claimed is:

1. A method for selectively reorienting articles for packaging, the method including the steps of:
   conveying articles on an article supply conveyor;
   engaging articles on said article supply conveyor; and
   transferring engaged articles from a portion of said article supply conveyor to an article receiving conveyor while at the same time selectively reorienting the orientation of transferring articles,
   wherein the engaging step includes engaging articles with an article carrier mounted on a rotating turret, and including the step of translating said turret in a direction parallel to said article supply conveyor and engaging a succeeding article on said article supply conveyor upstream of a position on said article supply conveyor in which there is no article.

2. The method of claim 1 including the further step of transferring articles to the receiving conveyor, operably disposed parallel to said article supply conveyor and operating in a direction opposite to the direction of conveyed articles on the article supply conveyor.

3. The method of claim 1 including the further step of selectively reorienting said articles by 90°.

4. The method of claim 1 including the further step of selectively reorienting said articles by 180°.

5. A method as in claim 1 wherein said selective reorienting of articles includes selectively reorienting articles to selected reoriented positions.

6. A method as in claim 1 wherein the engaging step includes engaging articles with an article carrier mounted on a rotary turret and said transferring step includes moving said carrier in a circular path while carrying and rotating said articles.

7. A method as in claim 6 including the further step of varying the speed of said article receiving conveyor.

8. A method of reorienting an article from a first orientation on a portion of a conveyor to a second orientation, different from said first orientation, on another portion of said conveyor, said method including the steps of:
   engaging an article in said first orientation on a conveyor;
   picking said article from a portion of said conveyor;
   reorienting said engaged article into a second orientation;
   placing said article in said second orientation on said other portion of said conveyor,
   including the step of transferring said article in a circular path while reorienting said article, and
   wherein said engaging step includes engaging a first article at a first station;
   then selectively reorienting said engaged first article;
   then engaging a different second article at a second station upstream from said first station;
   selectively reorienting said different second article; and
   placing said different reoriented second article on said other portion of said conveyor, and upstream of said first article.

9. A method of transferring articles from one conveyor portion to another conveyor portion including the steps of:
   engaging and picking articles from said one conveyor portion;
   transferring articles to said other conveying portion;
   selectively reorienting articles while transferring them between said conveyor portions; and
   including picking a succeeding article following an empty article space on said one conveyor portion and transferring said succeeding article to said other conveyor portion without an equivalent space next to a preceding article thereon.

10. A method as in claim 9 including transferring articles between portions of different conveyors.

11. A method as in claim 9 including transferring articles between portions of the same conveyor.

* * * * *